June 24, 1930.  R. W. YOUNG  1,765,783
PLIERS
Filed Feb. 9, 1926

Inventor
R. W. YOUNG
BY Harry C. Schwede
ATTORNEY

Patented June 24, 1930

1,765,783

UNITED STATES PATENT OFFICE

ROSS W. YOUNG, OF OAKLAND, CALIFORNIA

PLIERS

Application filed February 9, 1926. Serial No. 87,018.

The present invention relates to improvements in pliers and its particular object is to provide a pair of pliers particularly designed for removing the cord from the inside of a tire when the latter is to be repaired. For this operation the individual layers of cord are usually removed one after the other, the removed section of each successive layer being somewhat smaller than that of its antecedent so as to allow the patch to be firmly anchored in the successive layers. To remove a section of the cord it is customary to divide a section by cutting around the same with a knife especially prepared to cut to the depth of one cord only and to thereafter grip small portions only along the cut line by means of a suitable tool and to pull off the said section.

My pliers are designed to facilitate the latter operation and provide in combination means for lifting the edge of the cut section and means for gripping the lifted edge and for prying and pulling a strip the section.

Further details of my invention will appear as the specification proceeds.

Figure 1:
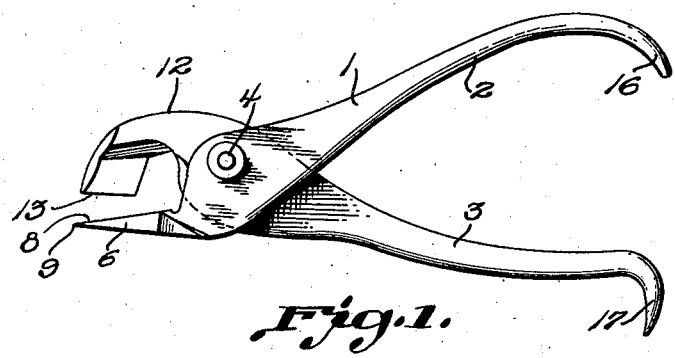
Figure 2:
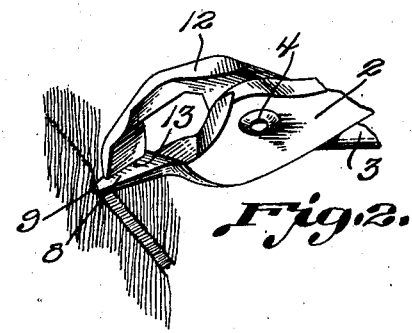
Figure 3:
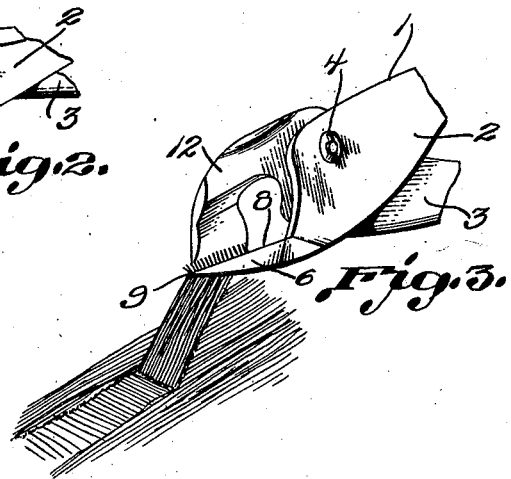
Figure 5:
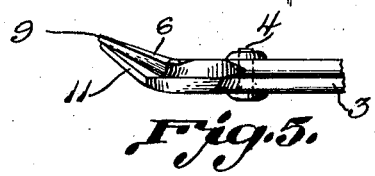
Figure 4:
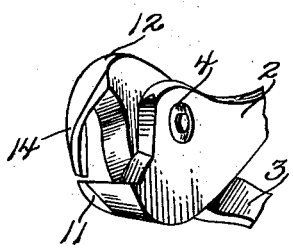

The preferred form of my invention is illustrated in the accompanying drawing, in which Figure 1 shows a plan view of my pliers, Figure 2 a perspective view showing the pliers in use in raising the edge of the section to be separated, Figure 3 a perspective view of the pliers in use in pulling off a strip, Figure 4 a perspective view looking at the pliers from the end, and Figure 5 a side view of the pliers.

While I have shown only the preferred form of the invention, I wish to have it understood that various changes or modifications may be made within the scope of the claims attached hereto without departing from the spirit of the invention.

My pliers consist of two members 2 and 3 pivoted together as shown at 4. The member 2 terminates on one side of the pivot in a tooth 6 which is off set from the central line of the pliers, arranged at a rather small angle to the horizontal plane of the pliers as shown in Figure 5 and also at an angle to a central vertical plane as shown at 8 in Figure 1. The inner face of the tooth marked 8 is the gripping face, is perfectly flat, triangular in form and terminates in a point 9 which is rather sharp and projects beyond the second gripping member to be described hereinafter so that it may be used for separating the edge of a cut section from the underlying strata in the manner shown in Figure 2. The under face of the tooth is curved transversely as shown at 11.

The second member 3 terminates in a jaw 12 set off at its base from the center line of the pliers on the opposite side and turned and twisted so that its end face 13 comes in contact with the face 8 of the tooth 6 along a longitudinal line and adjacent and in alignment with one side of face 8 in order to grip the short ends of the cords forming the tire. The face 13 is narrow so as to engage with the lower portion of the face 8 of the tooth only, as shown particularly well in Figure 2 and the engagement is such that the bottom face 14 is perfectly flush with the bottom of the face 11 of the tooth as appears from Figure 4. The bottom face of the jaw 12 is curved transversely, to merge into the curvature of the bottom face of the tooth 11, the curvature allowing a strip of cord gripped between the jaw and the tooth to be pried loose by the rolling over of the pliers. The gripping line of the pliers corresponds to the lower edge of the inner face 8 of the tooth and therefore is arranged at an angle to the horizontal plane and at an angle to the center line of the central vertical plane as previously described. It will be noted that the pivot 4 is set off from the center line of the pliers. At the rear ends the two members 2 and 3 end in the curvatures 16 and 17 shown in Figure 1 which are designed to provide convenient gripping surfaces for the hand of the operator.

The manner of using the pliers is as follows:

After a section of the innermost cord of a tire has been cut by means of a suitable tool the operator takes my pliers 1, gripping the rear ends of the members 2 and 3 with his right hand, introducing the extremity of the tooth under the edge of the cut section as shown in Figure 2, placing his left hand on the pivoted portion of the pliers and pulls the pliers towards himself, thereby separating the extreme edge from the underlying cord as shown in Figure 2. He then grips the extreme edge by placing the gripping face 8 of the tooth under the raised edge of the cord and closing the jaw upon the upper face of the cord.

Rolling over the pliers on the curved bottom face of the jaw 12 pries loose the first portion of the strip and the operation is continued by pulling the pliers across the face of the section to be removed in a manner shown in Figure 3.

I claim:

1. A pliers comprising a pair of levers pivoted intermediate their ends and terminating in gripping jaws spaced from their pivotal point, one of said jaws being twisted and terminating in a gripping portion for engaging the other of the jaws, the gripping portion being in alignment with one of the sides of the last named jaw.

2. A pliers comprising a pair of levers pivotally related intermediate their ends and terminating in co-acting gripping jaws, one of said jaws presenting a flat triangular surface, the other of the jaws being convoluted in such manner as to present an edge thereof to the first named jaw adjacent to and parallel with one of the sides thereof, the first named jaw protruding beyond the last named jaw.

In testimony whereof I affix my signature.

ROSS W. YOUNG.